US006304560B1

United States Patent
Archambaud et al.

(10) Patent No.: US 6,304,560 B1
(45) Date of Patent: *Oct. 16, 2001

(54) PERSONAL HANDY-PHONE SYSTEM WIRELESS LOCAL LOOPS AND METHODS OF TRANSMITTING INFORMATION WITHIN PERSONAL HANDY-PHONE SYSTEMS

(75) Inventors: Denis Archambaud, Antibes; Patrick Feyfant, Toulon; Philippe Gaglione, Mandelieu; Varenka Martin, Antibes; Oliver Weigelt, Antibes; Laurent Winckel, Antibes; Satoshi Yoshida, Nice, all of (FR)

(73) Assignee: VLSI Technology, Inc., Sunnyvale, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/942,108

(22) Filed: Sep. 30, 1997

(51) Int. Cl.[7] .............................. H04B 7/212; H04L 7/00
(52) U.S. Cl. ..................... 370/324; 370/337; 375/356; 455/465
(58) Field of Search .................... 370/315, 328, 370/338, 350, 503, 347, 337, 316, 324; 375/356, 371; 455/12.1, 454, 462, 465, 343, 3.1, 67.1; 379/59; 340/827

(56) References Cited

U.S. PATENT DOCUMENTS

| 5,533,027 | * | 7/1996 | Akerberg et al. ............... 370/347 |
| 5,555,258 | | 9/1996 | Snelling et al. ................ 370/29 |
| 5,586,122 | | 12/1996 | Suzuki et al. .................. 370/347 |
| 5,602,837 | | 2/1997 | Takahashi ..................... 370/280 |
| 5,604,789 | * | 2/1997 | Lerman ......................... 455/454 |
| 5,636,243 | | 6/1997 | Tanaka ......................... 375/219 |
| 5,884,142 | * | 3/1999 | Wiedeman et al. ............. 455/12.1 |
| 5,930,240 | * | 7/1999 | Wichman ....................... 370/315 |
| 5,943,326 | * | 8/1999 | Schroderus .................... 370/324 |
| 5,978,367 | * | 11/1999 | Kinnunen et al. .............. 370/337 |
| 5,995,500 | * | 11/1999 | Ma et al. ...................... 370/337 |
| 6,002,919 | * | 12/1999 | Posti ........................... 455/67.1 |
| 6,014,375 | * | 1/2000 | Janky ........................... 370/347 |
| 6,014,546 | * | 1/2000 | Georges et al. ................ 455/3.1 |

FOREIGN PATENT DOCUMENTS 8046565   2/1996   (JP) .

OTHER PUBLICATIONS

Murase et al. "Personal Multimedia Communications Services", IEEE, pp. 163–167, May 1996.*
Ishibashi et al. "A study on service data transfer procedure using SCF & SDF", IEEE, 6 pages, Dec. 1996.*
Akerberg, "Novel Radio Access Principles Useful for Third Generation Mobile Radio Systems", 1992, IEEE, pp. 1.2.1–1.2.6.*
*Cordless in the Local Loop*, by Margareta Zanichelli, from Cordless Telecommunications Worldwide, Walter H.W. Tuttlebee, pp. 71–87.
*The PHS Standard*, by Yuichiro Takagawa, from Cordless Telecommunications Worldwide, Walter H.W. Tuttlebee, pp. 429–438.
*Personal Handy–Phone System (PHS) Guidebook*, Ministry of Posts & Telecommunications, Japan.
PHS RCR STD–28, Chapter 1, General.

* cited by examiner

Primary Examiner—Hassan Kizou
Assistant Examiner—John Pezzlo
(74) Attorney, Agent, or Firm—Wells, St. John, Roberts, Gregory & Matkin, P.S.

(57) ABSTRACT

The present invention provides methods of transmitting information within a personal handy-phone system wireless local loop and personal handy-phone system wireless local loops. One embodiment of a personal handy-phone system wireless local loop according to the present invention comprises: a base station; a repeater station configured to transmit a plurality of uplink radio signals to the base station and receive a plurality of downlink radio signals from the base station; and a portable station configured to transmit the downlink radio signals to the repeater station and receive the uplink radio signals from the repeater station.

45 Claims, 7 Drawing Sheets

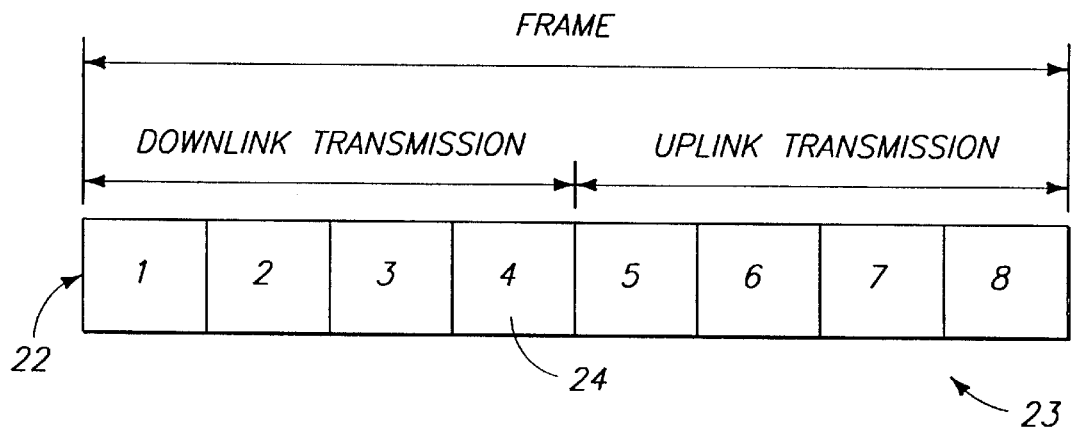
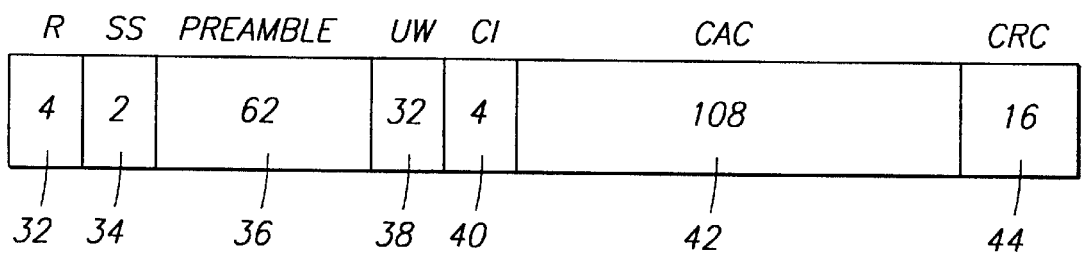

PERSONAL HANDY-PHONE SYSTEM WIRELESS LOCAL LOOPS AND METHODS OF TRANSMITTING INFORMATION WITHIN PERSONAL HANDY-PHONE SYSTEMS

TECHNICAL FIELD

The present invention relates to personal handy-phone system wireless local loops and methods of transmitting information within personal handy-phone systems.

BACKGROUND OF THE INVENTION

Telephone networks typically utilize wired analog circuits to connect a user's telephone to the local exchange of the network. This interconnection of the user's telephone and the network is referred to as the "local loop." The arrival of affordable analog cordless telephones enables the use of radio to provide the link from an ordinary telephone subscriber to the local exchange. The drop-in costs for the radio technology have fallen and "wireless local loops" have become an economically viable proposition.

Many aspects exist that make wireless local loop (also referred to as "radio access") dissimilar from other local loop access alternatives, including wire and optical fiber. The numerous benefits of providing a wireless local loop are easily recognized. A short list of benefits includes providing terminal mobility, replacing obsolete copper cabling, providing access in a competitive environment, providing services to new areas, enhancing capacity of an existing network, providing back-up for deteriorating lines, and allowing fast deployment.

Although most of the global telecommunications network is based upon analog technology, broadband technology and fixed networks (e.g., Integrated Services Digital Network (ISDN) and Asynchronous Transfer Mode (ATM)) provide a new scope of applications. Such applications include providing video data over telephone lines and telephone services over cable television infrastructures.

A variety of digital wireless communication technologies exist today, including narrowband to wideband and point-to-point broadcast. One such digital communication system is the personal handy-phone system (PHS). The personal handy-phone system is a cordless telephone system that offers integrated telecommunication services, such as voice and data, via a universal radio interface. The personal handy-phone system offers digitalization of the communication system. In particular, the digital personal handy-phone system offers improved quality and effective use of frequencies.

Personal handy-phone systems comprise at least one base station, also referred to as a cell stations, and a plurality of corresponding personal stations, also referred to as handsets. The personal handy-phone system offers flexible inter-connectability wherein connection of a personal station with a plurality base stations at various locations such as the office, home, or outdoors is possible. The PHS standard is set forth by the Telecommunications Technical Committee of Japan in "Personal Handy Phone System", Japanese Telecommunications System Standard, RCR-STD 28.

The personal handy-phone system also offers connectability with existing communications networks. Connection is possible with analog telephone networks as well as digital networks.

Personal handy-phone systems are designed to provide wireless multimedia communications, terminal mobility, and complete two-way communications. Personal stations and base stations of the personal handy-phone system are configured to transmit and receive data via a plurality of data packets, also referred to as slots.

Personal handy-phone systems employ a microcellular structure. Utilization of a microcellular structure reduces base station construction costs, reduces terminal size, weight and power consumption, and enables handling of a high volume of communication traffic.

The base stations may be of a low power output type (i.e., 10 mW) generally for indoor applications, or a standard power output type (i.e., 20 mW) or high power output type (i.e., 100–500 mW) for outdoor applications. Group control functions may be implemented to increase communication channels in an area with heavy traffic whereby multiple base stations are controlled via the same control channel. Such stations may be arranged in a master/slave configuration.

BRIEF DESCRIPTION OF THE DRAWINGS

Preferred embodiments of the invention are described below with reference to the following accompanying drawings.

FIG. 4 is an illustrative view of a frame structure according to the personal handy-phone system communication protocol.

FIG. 5 is an illustrative view of the structure of a control slot according to the personal handy-phone system communication protocol.

DETAILED DESCRIPTION OF THE PREFERRED EMBODIMENTS

Figure 1:
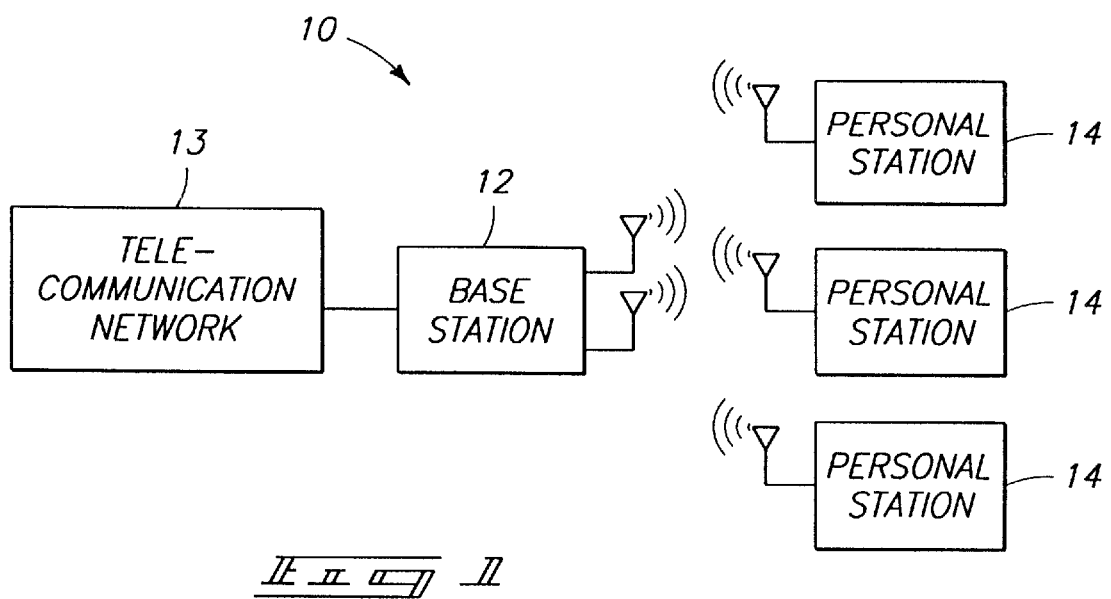
FIG. 1 is a block diagram of a personal handy-phone system comprising a base station and a plurality of personal stations in radio communication with the base station.

This disclosure of the invention is submitted in furtherance of the constitutional purposes of the U.S. Patent Laws "to promote the progress of science and useful arts" (Article 1, Section 8).

According to a first aspect of the present invention, a personal handy-phone system wireless local loop comprises: a base station; a repeater station configured to transmit a plurality of uplink radio signals to the base station and receive a plurality of downlink radio signals from the base station; and a portable station configured to transmit the uplink radio signals to the repeater station and receive the downlink radio signals from the repeater station.

According to a next aspect of the present invention a personal handy-phone system wireless local loop comprises: a base station configured to communicate via a plurality of first radio frequency signals within a first cell; a repeater station positioned within the first cell and configured to communicate with the base station via the first radio frequency signals, the repeater station configured to communicate via a plurality of second radio frequency signals within a second cell; and a portable station positioned within the second cell and configured to communicate with the repeater station via the second radio frequency signals.

The present invention provides in another aspect of the present invention a method of transmitting information within a personal handy-phone system comprising: first receiving a reference event comprising a predefined pattern; following the first receiving, establishing a receive timing reference, a first transmit timing reference and a second transmit timing reference; second receiving a plurality of uplink personal handy-phone system slots and a plurality of downlink personal handy-phone system slots; and transmitting the uplink personal handy-phone system slots and the downlink personal handy-phone system slots.

Another aspect of the present invention provides a method of transmitting information within a personal handy-phone system wireless local loop comprising: using a base station, transmitting a plurality of downlink slots and receiving a plurality of uplink slots; using a portable station, transmitting the uplink slots and receiving the downlink slots; and establishing a receive timing reference, a first transmit timing reference and a second transmit timing reference within a repeater station, the receive timing reference lags a transmit timing reference of the base station and the first transmit timing reference of the repeater station leads a receive timing reference of the base station and the second transmit timing reference of the repeater station leads a receive timing reference of the portable station.

Yet another aspect of the present invention provides a method of transmitting information within a personal handy-phone system wireless local loop comprising: first receiving a reference event comprising a predefined pattern; following the first receiving, establishing a receive timing reference, a first transmit timing reference and a second transmit timing reference; second receiving a downlink slot at the repeater station in accordance with the receive timing reference; third receiving an uplink slot at the repeater station in accordance with the receive timing reference; following the third receiving, transmitting the uplink slot in accordance with the first transmit timing reference; and following the second receiving, transmitting the downlink slot in accordance with the second transmit timing reference.

The present invention provides a personal handy-phone system (PHS) wireless local loop (WLL). The invention discloses in one embodiment a personal handy-phone system repeater station for use in wireless local loop applications. This configuration permits communication between a plurality of PHS WLL communications stations separated by a distance which may exceed the diameter of a cell.

Referring to FIG. 1, a typical personal handy-phone system 10 is shown. The illustrated personal handy-phone system 10 comprises a base station 12 and a plurality of personal stations 14. Base station 12 is typically coupled with a telecommunication network 13, such as an ISDN or Public Switched Telephone Network (PSTN). A given cell may contain plural base stations 12 depending upon the traffic volume to be handled. In an exemplary embodiment, a cell comprises a master base station and plurality of slave base stations for such increased transmission capabilities.

The personal handy-phone system is configured to allow movement of the personal stations 14 throughout a cell during communication with a respective base station 12. Base stations 12 are configured to handover communications with a personal station 14 to an adjacent base station 12 responsive to the movement of the personal station 14 from one location to another. Personal stations 14 are also configured to provide radio communications directly to other personal stations 14.

Arrangement of the personal handy-phone system in a wireless local loop configuration generally permits radio frequency communications across greater distances. For example, wireless communications between communication stations of the PHS wireless local loop are possible at distances of five kilometers.

Figure 2:
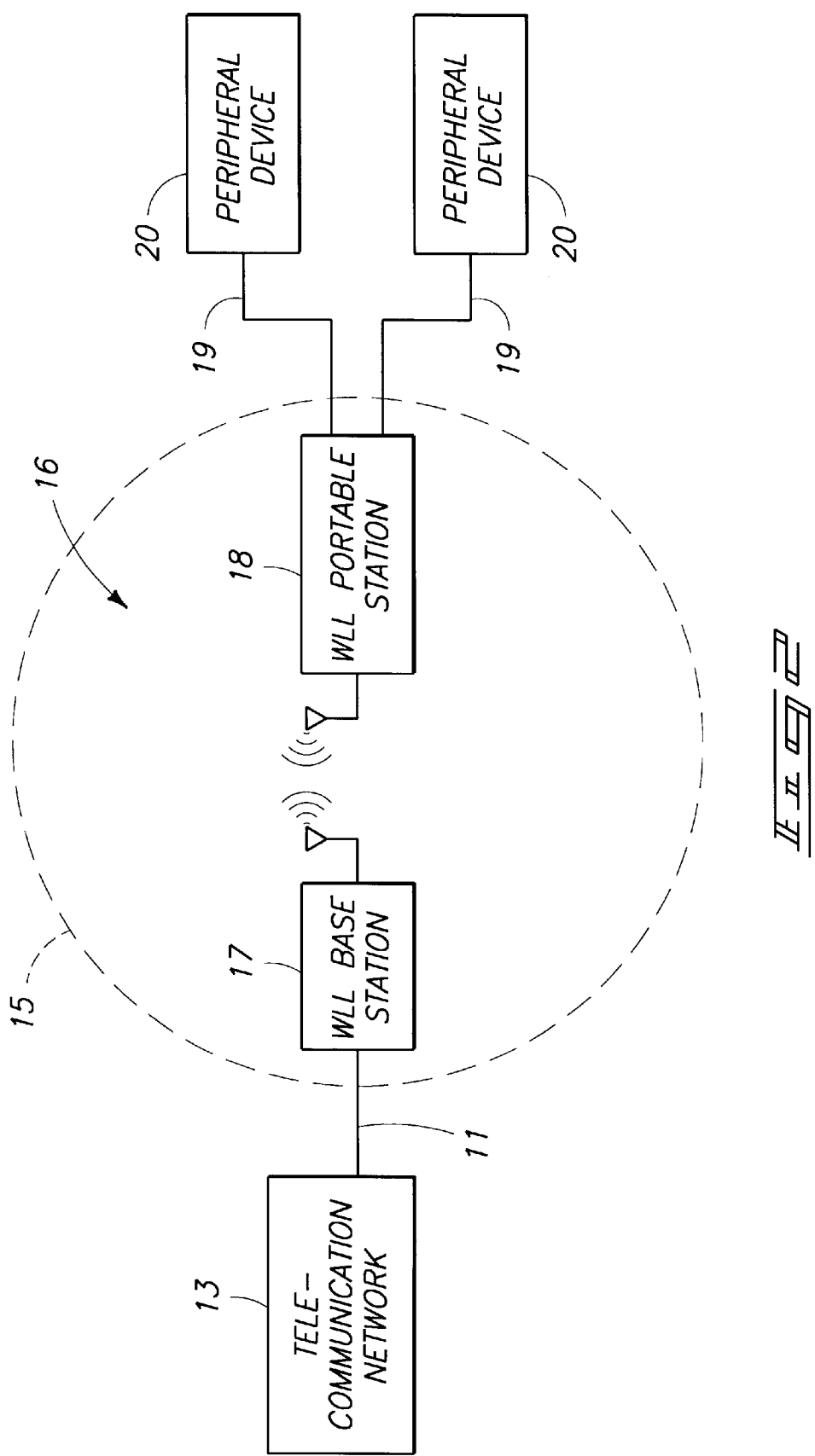
FIG. 2 is a block diagram of a first embodiment of a wireless local loop comprising a base station, and a portable station coupled with a plurality of peripheral devices and in radio communication with the base station.

Referring to FIG. 2, a wireless local loop 16 is shown. The illustrated embodiment of wireless local loop 16 comprises plural WLL communication stations including a WLL base station 17 and a WLL portable station 18. WLL base station 17 is coupled via a backbone 11 with telecommunication network 13. Backbone 11 comprises copper wire, optical fiber, microwave transmission or other suitable communication media for transmitting data. WLL base station 17 defines a cell 15 wherein radio frequency communications with a WLL portable station 18 are possible.

WLL portable station 18 is located within cell 15 in the illustrated embodiment. WLL portable station 18 is coupled with a plurality of peripheral devices 20 via respective subscriber lines 19. Exemplary peripheral devices 20 include telephones for providing voice data communications or facsimile devices for providing textual or graphical communications.

Figure 3:
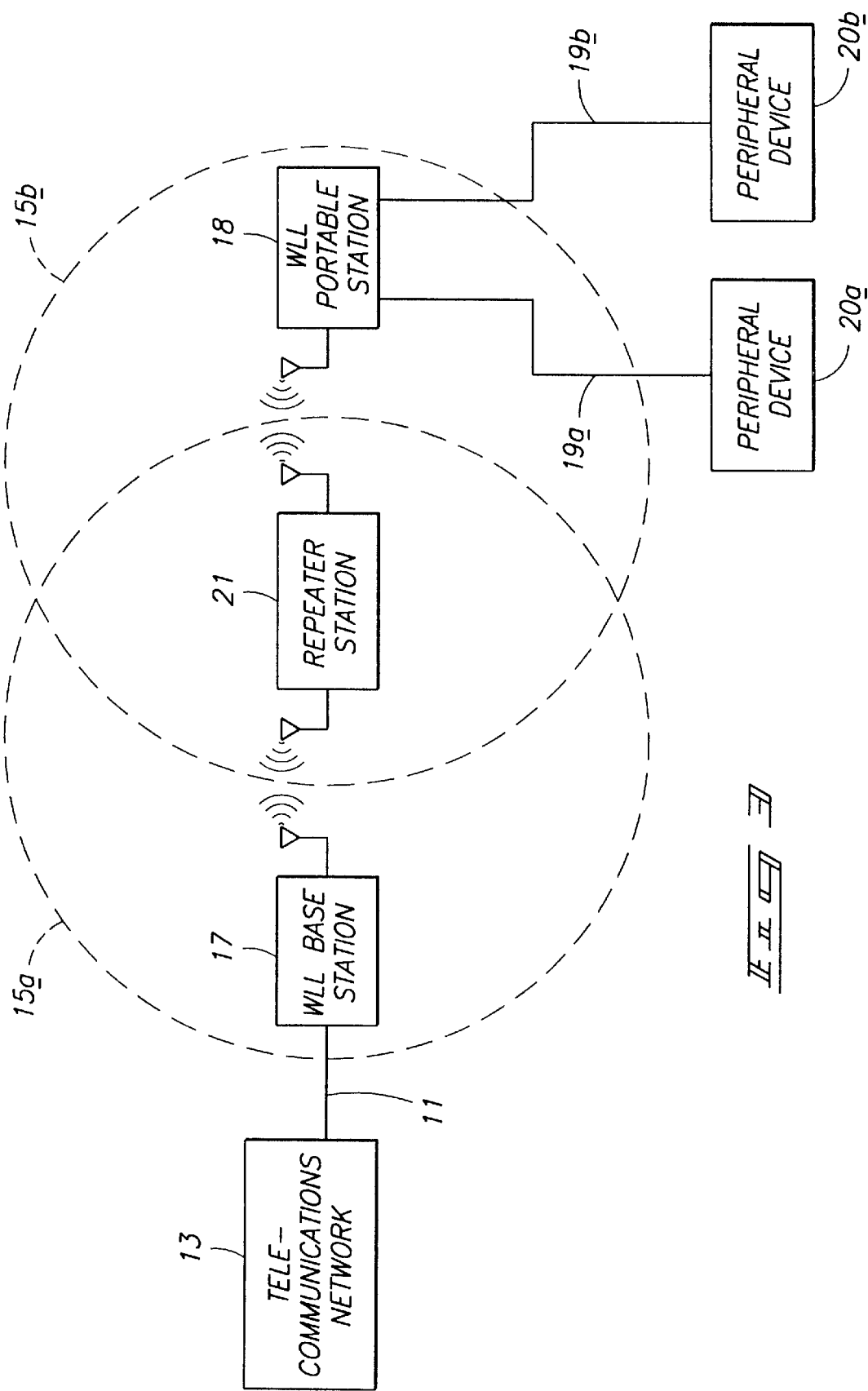
FIG. 3 is a block diagram of a second embodiment of a wireless local loop comprising a repeater station provided intermediate a base station and a portable station.

Referring to FIG. 3, an embodiment of a wireless local loop 16 configured to provide wireless communications over increased distances is shown. Similar to the embodiment of the wireless local loop 16 shown in FIG. 2, WLL portable station 18 is coupled with a plurality of peripheral devices 20 via subscriber lines 19 and WLL base station 17 is coupled with telecommunication network 13.

The wireless local loop 16 shown in FIG. 3 additionally comprises a repeater station 21 intermediate WLL base station 17 and WLL portable station 18. Repeater station 21 comprises transceiver circuitry and is configured for wireless communication with WLL base station 17 and WLL portable station 18. The utilization of repeater station 21 in the depicted embodiment of the wireless local loop 16 permits radio frequency communications between WLL base station 17 and WLL portable station 18 at distances which exceed the diameter of a single cell 15.

Repeater station 21 is configured to operate as a portable station when communicating with base station 17 and is configured to operate as a base station when communicating with portable station 18.

WLL base station 17 defines a first cell 15a for providing wireless communications. Repeater station 21 is located within the first cell 15a enabling radio frequency communications with WLL base station 17 via a plurality of first radio frequency signals. Repeater station 21 defines a second cell 15b, different from the first cell 15a, for providing wireless communications. WLL portable station 18 is located within second cell 15b enabling radio frequency communications with repeater station 21 via a plurality of second radio frequency signals. The second radio frequency signals are the same frequency as the first radio frequency signals in one embodiment of the present invention. Alternatively, first and second radio frequency signals are communicated at different frequencies.

The radio interfaces of the base station 17, portable station 18 and repeater station 21 individually have four-channel time division multiple access capability with time division duplexing (four-channel TDMA-TDD). This communication protocol provides one control channel and three traffic channels for a WLL base station 17. Providing time division multiple access capability with time division duplexing avoids the need for paired frequency bands.

Referring to FIG. 4, a typical PHS radio channel structure 23 is shown. The radio channel structure 23 comprises a frame 22 which comprises a plurality of slots 24 (eight slots are shown defining one frame in FIG. 4). According to the PHS protocol, slots 24 individually comprise 240 bits. In particular, one five millisecond TDMA-TDD frame 22 within the radio channel structure 20 includes four slots for base station transmission, and four slots for portable station transmission. Communications from WLL base station 17 to WLL portable station 18, referred to herein as downlink communications, occur within the first four communication slots 24 of the frame 22 (i.e., slots 1–4). Communications from WLL portable station 18 to the WLL base station 17, referred to herein as uplink communications, occur within the subsequent four communication slots 24 of the illustrated frame 22 (i.e., slots 5–8).

The personal handy-phone system communications protocol provides for a control channel (CCH) and a communication channel, also referred to as a traffic channel (TCH). The control channel (CCH) may be one of a variety of formats in accordance with the personal handy-phone system standard. The control channel is composed of a combination of a common control channel (CCCH) and an associated control channel (ACCH). The common control channel and associated control channel make up a single dedicated channel providing improved performance in conditions of intermittent communications reception. The traffic channel is utilized to transmit user traffic information.

Referring to FIG. 5, a typical control slot 30 is shown. Control slot 30 comprises 224 bits, thus allowing sixteen guard bits. Control slot 30 comprises ramp field (R) 32. The ramp field (R) 32 has four ramp bits. Control slot 30 further comprises a start symbol field (SS) 34. Start symbol field (SS) 34 has two start symbol bits. Control slot 30 further comprises a preamble 36 following the start symbol field 34. The preamble 36 comprises sixty-two bits.

Control slot 30 additionally comprises a unique word (UW) 38 which follows the preamble 36. The unique word (UW) has thirty-two bits. The unique word 38 is a predetermined pattern which establishes transmit and receive timing. The control slot 30 further comprises channel identifier field (CI) 40 after the unique word 38. The channel identifier field (CI) 40 has four bits. The control slot 30 further comprises a common access channel field (CAC) 42 and a cyclic redundancy check field (CRC) 44 respectively following the channel identifier field 40.

Common access channel field 42 may comprise one of a plurality of channels. For example, field 42 is selectively a broadcast channel (BCCH), paging channel (PCH) or specific cell channel (SCCH) as defined within the PHS standard.

A broadcast channel is a one-way downlink channel to report control information from the WLL base station 17 to the portable station 18. It is utilized to transmit information related to channel structure and system information. A paging channel is a one-way downlink, point-to-multipoint channel that simultaneously transmits identical information to individual cells or a wide area of multiple cells. A specific cell channel is a bidirectional, point-to-multipoint channel that transmits information needed for call connection between the WLL base station 17 and the WLL portable station 18. The specific cell channel transmits independent information to each cell.

Figure 6:
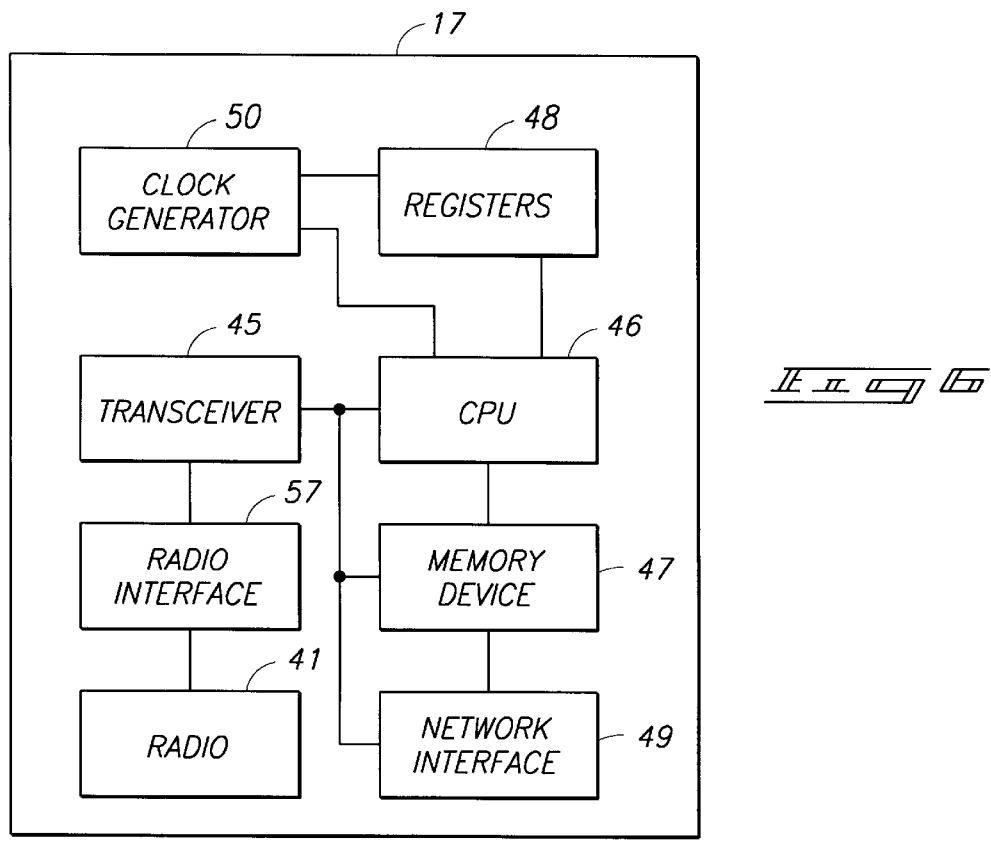
FIG. 6 is a block diagram of one embodiment of a wireless local loop communication station.

Referring to FIG. 6, radio frequency operations of WLL base station 17, WLL portable station 18 and repeater station 21 are discussed with reference to the depicted embodiment of WLL base station 17. It is to be understood that the radio frequency operations and the internal components of WLL portable station 18 and repeater station 21 operate in a similar manner as those of WLL base station 17 shown in FIG. 6 in one embodiment of the invention. Differences between the transceivers of stations 17, 18, and the transceiver of station 21 exist in the illustrated embodiments. Such differences are discussed in detail below with reference to FIG. 7 and FIG. 8.

Still referring to FIG. 6, the illustrated WLL base station 17 comprises a radio 41, radio interface 57, transceiver 45, central processing unit (CPU) 46, memory device 47 and registers 48, network interface 49 and clock generator 50. WLL portable station 18 and repeater station 21 similarly comprise a radio, radio interface, transceiver, central processing unit (CPU), memory device, registers and clock generator. One embodiment of station 18 comprises a peripheral interface in place of network interface 49. Peripheral interface is configured to provide data communications intermediate peripheral devices 20 and WLL portable station 18. Radio interface 57 is provided for coupling of transceiver 45 with radio 41. Radio 41 comprises appropriate circuitry for transmitting and receiving radio frequency signals. According to one embodiment of the subject invention, radio 41 is provided in a separate integrated circuitry package apart from the other circuitry of WLL base station 17.

Clock generator 50 is configured to generate a plurality of clock reference signals for appropriate timing in accordance with the personal handy-phone system standard Such clock signals include a 19.2 MHz signal, 9.6 MHz systems clock signal and a 384 kHz bit-rate signal. Clock generator 50 is additionally operable to assist with the implementation of digital phase lock loop operations for eliminating drift and providing synchronization.

In a preferred embodiment, WLL base station 17 includes an antenna configuration (not shown in FIG. 6) having dual antennas for providing antenna diversity. Antenna diversity provides improved spectral efficiency. WLL base station 17 is configured to receive communications from WLL portable station 18 via the particular antenna which provides the best signal.

Central processing unit 46 provides control information to transceiver 45 for controlling the wireless operations. Further, central processing unit 46 monitors control information from transceiver 45 during receive modes of operation. Central processing unit 46 is configured via operational software code to control the communications operation of transceiver 45. Central processing unit 46, in one embodiment, is configured to implement the appropriate timing references of the corresponding communications device 17, 18, 21.

Central processing unit 46 is coupled with a memory device 47. Software code for configuring central processing unit 46 is stored in memory device 47. In one embodiment, memory device 47 comprises volatile memory, such as RAM, permitting flexibility of storing different operational software code. In an alternative embodiment, memory device 47 comprises a ROM or non-volatile memory for storing software code utilized by central processing unit 46.

WLL base station 17 is configured to output data received via transceiver 45 to the telecommunication network 13 via a network interface 49. WLL base station 17 is configured to apply data received from the telecommunications network 13 and network interface 49 to the transceiver 45 for transmission to portable station 18 of the wireless local loop.

WLL portable station 18 is configured to output data received via transceiver 45 to an appropriate peripheral device 20 via the peripheral interface. The WLL portable station 18 is configured to apply data received from peripheral devices 20 to the transceiver 45 for transmission to the base station 17 of the wireless local loop.

Figure 7:
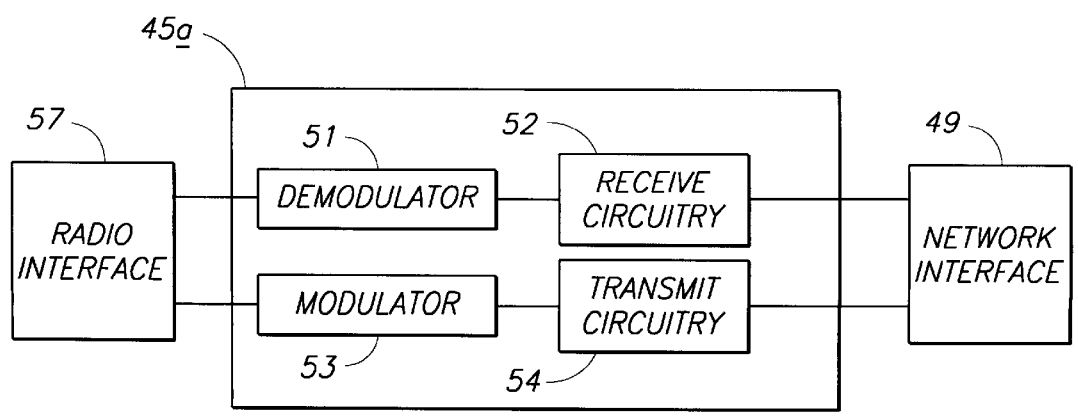
FIG. 7 is a block diagram of one embodiment of a transceiver of wireless local loop base and portable stations.
Figure 8:
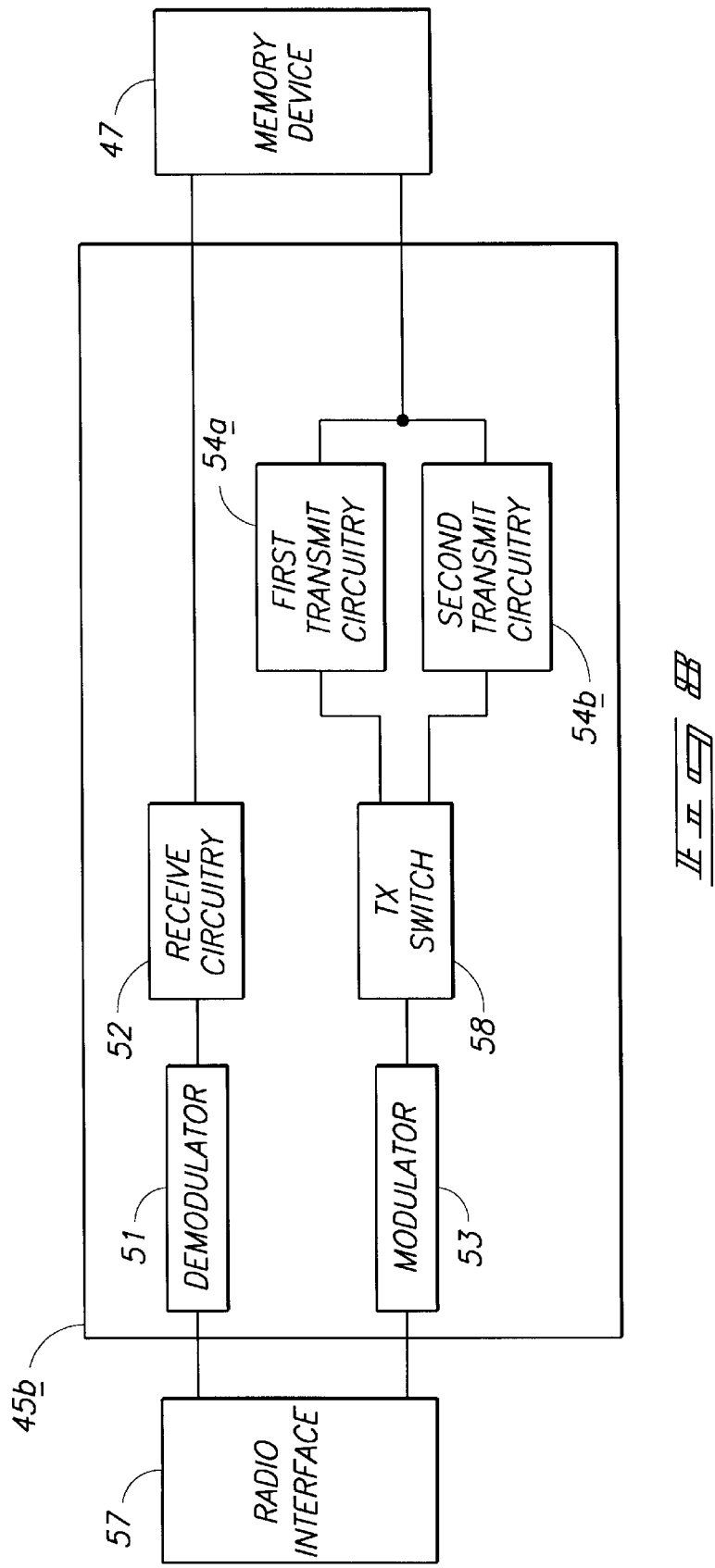
FIG. 8 is a block diagram of one embodiment of a transceiver of a wireless local loop repeater station.

Certain control information may be applied to registers 48 and clock generator 50. Clock generator 50 is configured to output control information to central processing unit 46 via registers 48. Registers 48 are configured to provide bi-directional communications. Referring now to FIG. 7 and FIG. 8, differences between the transceiver of repeater station 21 and the transceivers of WLL stations 17, 18 in the illustrated embodiment are discussed below wherein like reference numerals represent like components. An embodiment of transceiver 45a of WLL stations 17, 18 is shown in FIG. 7, although circuitry 52, 54 of portable station 18 is coupled with the peripheral interface instead of network interface 49. An embodiment of transceiver 45b of repeater station 21 is shown in FIG. 8. The transceiver 45b of repeater station 21 includes plural transmit circuits in the depicted embodiment.

As shown in FIG. 7, the illustrated transceiver 45a of WLL stations 17, 18 includes a receive path comprising a demodulator 51 and receive circuitry 52 and a transmit path comprising a modulator 53 and transmit circuitry 54. Receive circuitry 52 and transmit circuitry 54 perform respective manipulation operations of retrieving and providing both the data and control information into slots and frames in accordance with the personal handy-phone system communications protocol. Circuitry 52, 54 also provide synchronization operations.

Demodulator 51 and modulator 53 within the respective receive and transmit paths are operable to retrieve the baseband signal from the radio frequency signals and modulate the radio frequency carrier signal by the baseband signal, respectively.

As shown in FIG. 8, the illustrated embodiment of transceiver 45b of repeater station 21 includes a receive path and two transmit paths. In other embodiments, repeater station 21 comprises plural transceivers. The repeater station 21 is configured to simultaneously communicate with WLL base station 17 and WLL portable station 18. Repeater station 21 is configured to provide simultaneous transmission and/or reception of first and second radio frequency signals. In one embodiment, repeater station 21 is configured to transmit radio frequency signals to one of communication stations 17, 18 while receiving radio frequency signals from the other station and vice versa.

The receive path of the transceiver 45b of repeater station 21 comprises demodulator 51 and receive circuitry 52. Demodulator 51 recovers the baseband signal from the radio frequency signal received within radio 41 and provided via interface 57. In one embodiment, receive circuitry 52 extracts data and control information from the PHS slots within the baseband signals. The control and data information is applied to memory device 47 (e.g., RAM) for temporary storage prior to application to the appropriate transmit path for retransmission to the appropriate communications station 17, 18. In an alternative embodiment, the received control and data information is applied directly to the appropriate transmit path for retransmission. Further, the control and data information may be retained in the PHS slot format within repeater station 21 intermediate the reception and retransmission operations thereby.

Repeater station 21 includes two transmit paths comprising modulator 53 and respective ones of first transmit circuitry 54a and second transmit circuitry 54b. A transmit (TX) switch 58 couples the transmit circuits 54a, 54b with modulator 53. Central processing unit 46 controls TX switch 58 and specifies which transmit path is utilized for transmission according to the timing references discussed below. First transmit circuit 54a is operable to transmit first radio frequency signals to WLL base station 17. Second transmit circuit 54b is operable to transmit second radio frequency signals to WLL portable station 18.

Synchronization of the personal handy-phone system communications system is a concern for ensuring reliable transmission of data and is discussed immediately hereafter. Reference events are utilized for ensuring synchronization of WLL base stations 17 and WLL portable stations 18 within the PHS wireless local loop 16. In particular, WLL base stations 17 are configured to transmit a reference event which is received within a corresponding WLL portable station 18. WLL portable stations 18 are configured to synchronize to the reference event generated by the appropriate WLL base station 12. Repeater station 21 is also configured to receive and establish synchronization from reception of the reference event.

As described above, WLL communication stations 17, 18, 21 transmit slots in accordance with the personal handy-phone standard. The PHS slots include a unique word 38 which is utilized as the synchronizing reference event in accordance with one embodiment of the present invention. WLL base station 17 is configured to transmit a unique word 38 of a predefined pattern, which is recognized and detected within repeater station 21 and portable station 18.

In typical personal handy-phone system configurations, delay of the radio frequency signals as a result of distances between PHS communication stations is not considered. In such configurations, the PHS communications stations are synchronized to the same receive timing and transmit timing. Any delay between the PHS communication stations is due to RF filters within the transceiver circuitry of the individual stations.

As described above, the present invention permits communications across greater distances between the wireless local loop communication stations. Such distances may exceed 5 km. In such situations, it is necessary to compensate for the delay of the radio frequency signals through the air. This delay due to air is added to the delay caused by the RF filters within the transceiver circuitry of the WLL communication stations.

Figure 9:
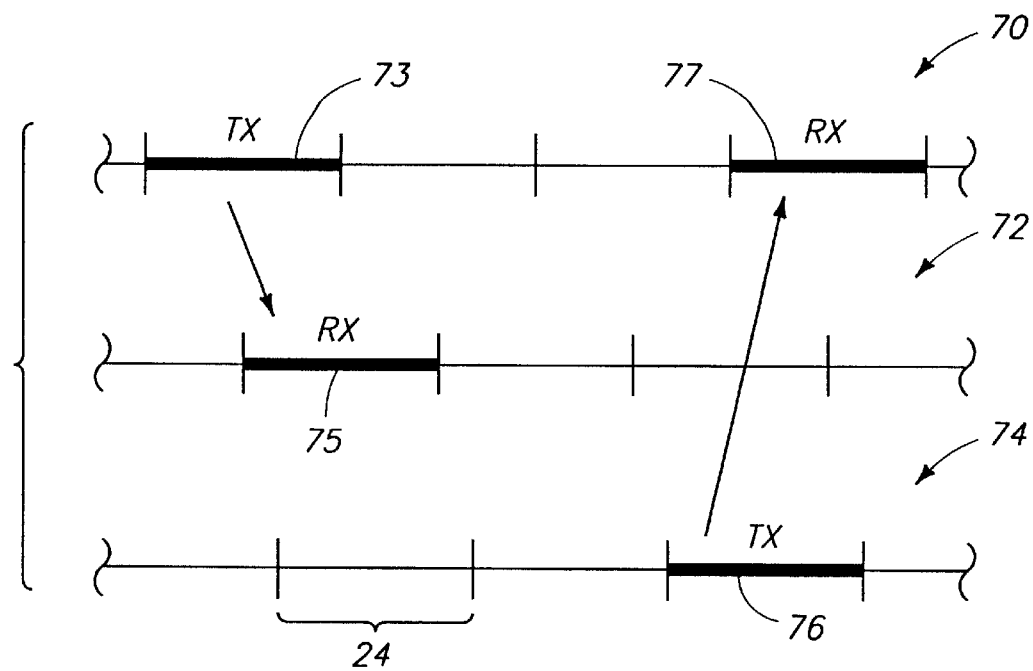
FIG. 9 is an illustrative diagram representing timing references of the communication stations of the first embodiment of the wireless local loop shown in FIG. 2.

Referring to FIG. 9, timing diagrams for the wireless local loop of FIG. 2 are shown. Time progresses (increases) in FIG. 9 from left to right. Transmit and receive timing references for the WLL base station 17 are represented by line 70 and WLL portable station 18 transmit and receive timing references are represented by respective lines 72, 74. The timing diagrams are defined by a plurality of slots 24 in accordance with the PHS communication protocol.

WLL portable station 18 awaits reception of a reference event (e.g., unique word 38 of a transmitted slot) prior to establishing synchronization with WLL base station 17.

After a unique word 38 having the appropriate pattern is detected, WLL portable station 18 establishes appropriate transmit and receive timing references. The receive timing reference of station 18 is established by the reception of the reference event. As represented by line 72, the receive timing reference of station 18 lags the transmit timing reference of station 17. Such lagging of receive timing reference of station 18 by a predetermined number of bits is due to the distance between WLL stations 17, 18.

As represented by line 74, the transmit timing reference of portable station 18 is shifted to the left a predetermined number of bits (with respect to the receive timing reference of base station 17) to compensate for the delay caused by the distance intermediate WLL communication stations 17, 18. Such shifting aligns the transmit timing reference of station 18 with the receive timing reference of station 17. The transmit timing reference of station 18 leads the receiving timing reference of station 17 following the appropriate shifting.

The shifting of WLL portable station transmit timing references may be varied dependent upon the distance between the WLL communication stations 17, 18. Such varying of the shifting may be implemented via software code utilized by central processing units 46 of the respective stations 17, 18.

Still referring to FIG. 9, a downlink slot 73 is initially transmitted from WLL base station 17. The radio frequency signal corresponding to downlink slot 73 is received at WLL portable station 18 at slot 75. As shown, slot 75 is received later in time, compared with the time of transmission of slot 73. Receiving the slot 75 after transmission corresponds to the delay caused by the distances intermediate the wireless local loop communication stations 17, 18.

An uplink slot 76 is transmitted from WLL portable station 18. The radio frequency signal corresponding to uplink slot 76 is received at WLL base station 17 at slot 77. As shown, slot 76 is shifted in time to the left compared with the timing of slot 77. Such shifting in time compensates for the delay caused by the distances intermediate the wireless local loop communication stations 17, 18.

Figure 10:
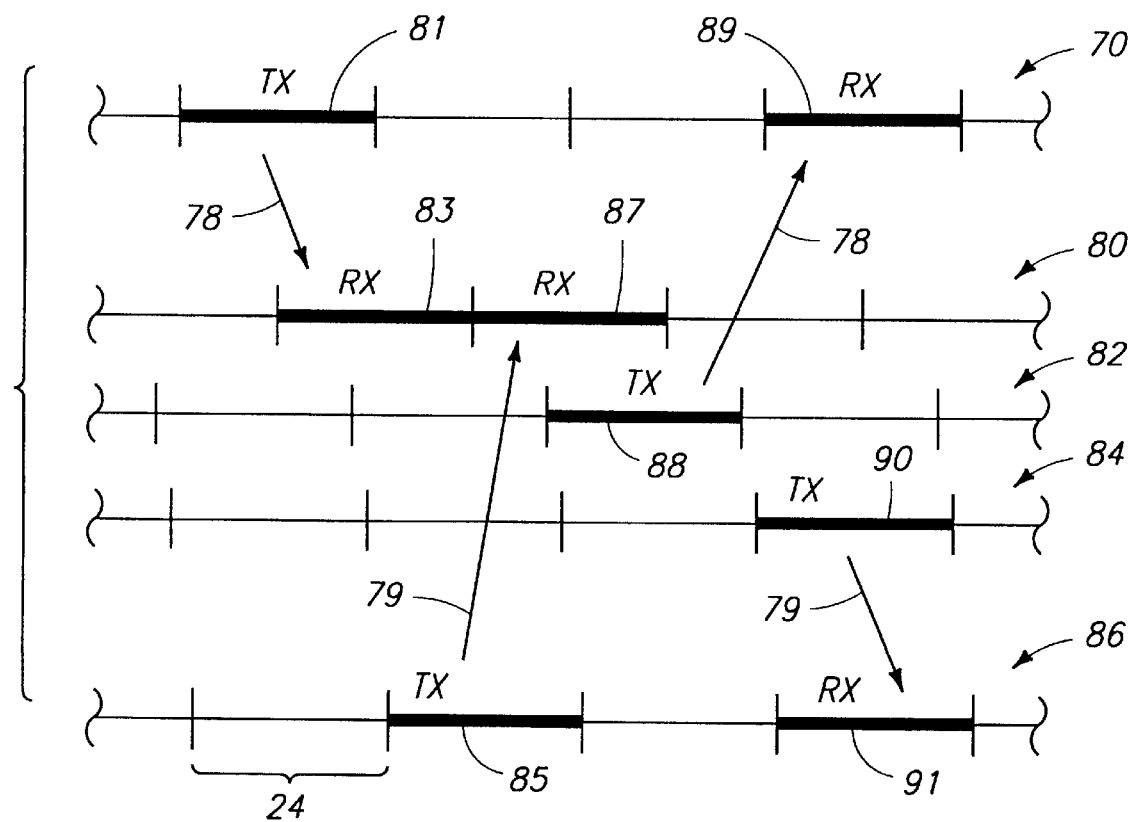
FIG. 10 is an illustrative diagram representing timing references of the communication stations of the second embodiment of the wireless local loop shown in FIG. 3.

Referring to FIG. 10, timing diagrams for the wireless local loop of FIG. 3 are shown. Time increases in FIG. 10 from left to right. Repeater station 21 is configured for synchronization with communication stations 17, 18 in accordance with additional aspects of the present invention. The timing references of repeater 21 and WLL portable station 18 are based upon the timing references of WLL base station 17.

WLL base station transmit and receive timing references are again represented by line 70. A receive timing reference, first transmit timing and second transmit timing reference of WLL repeater 21 are represented by lines 80, 82, 84, respectively. The transmit and receive timing references of WLL portable station 18 are represented by line 86.

Similar to the synchronization described above, repeater station 21 awaits reception of a reference event from WLL base station 17 to commence the establishment of synchronization. Following the reception of the reference event (e.g., unique word 38 of a transmitted slot), WLL repeater station 21 establishes receive timing, first transmit timing and second transmit timing references. The receive timing reference of station 21 is established by the reception of the reference event.

Repeater station 21 transmits a reference event (e.g., unique word 38 having a predefined pattern) following the reception of the reference event from station 17. Following reception of the reference event from station 21, WLL portable station 18 establishes internal transmit and receive timing references.

As represented by line 80, the receive timing reference of repeater station 21 lags transmit timing reference of WLL base station 17. First transmit timing reference of repeater station 21, represented by line 82, is shifted in time to the left with respect to the receive timing reference of WLL base station 17. The first transmit timing reference of station 21 leads the receive timing reference of station 17. The shifting of the repeater station timing references compensates for the delay resulting from the distance intermediate WLL reference station 17 and repeater station 21.

As represented by line 86, the transmit timing reference of WLL portable station 18 is shifted in time to the left with respect to the receive timing reference of repeater station 21, represented by line 80. The transmit timing reference of station 18 leads the receive timing reference of station 21. The receive timing reference of WLL portable station 18 is established by the reception of the reference event from station 21. The receive timing reference of station 18 lags the second transmit timing reference of repeater station 21, represented by line 84.

The transmit timing reference of WLL portable station 18, represented by line 86, is configured to compensate for the distance between WLL portable station 18 and the repeater station 21. In particular, WLL portable station 18 is configured to transmit a slot prior to the receive timing reference of the repeater station 21.

Still referring to FIG. 10, communications within the first cell 15a (referred to as first radio frequency signals) are represented by arrows 78. Arrows 78 represent communications intermediate WLL base station 17 and repeater station 21. Communications within the second cell 15b (referred to as second radio frequency signals) are represented by arrows 79. Arrows 79 represent communications intermediate WLL portable station 18 and repeater station 21.

A downlink slot 81 is initially transmitted from WLL base station 17. The radio frequency signal corresponding to downlink slot 81 is received at slot 83 within repeater station 21 according to the receive timing reference of station 21. The information within the signal received at slot 83 within the repeater station 21 is transmitted via a radio frequency signal at slot 90. The radio frequency signal corresponding to slot 90 is received within WLL base station 17 at slot 91.

An uplink slot 85 is transmitted from WLL portable station 18. The radio frequency signal corresponding to slot 85 is received within repeater station 21 at slot 87 according to the receive timing reference of station 21. The information within the signal received at slot 87 within the repeater station 21 is transmitted via a radio frequency signal at slot 88. The radio frequency signal corresponding to slot 88 is received within WLL base station 17 at slot 89.

The compensation for the delay may vary dependent upon the distances between the respective communication stations 17, 18, 21. In particular, the degrees of compensation (i.e., number of bits within a shift) of repeater station 21 with respect to WLL base station 17, and WLL portable station 18 with respect to repeater station 21 may be different to compensate for a difference in the respective distances intermediate stations 17 and 21, and stations 18 and 21.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A wireless local loop, comprising:
   a base station;
   a repeater station configured to transmit a plurality of uplink radio signals to the base station, to receive a plurality of downlink radio signals from the base station, and to transmit the downlink radio signals; and
   a portable station configured to transmit the uplink radio signals to the repeater station and receive the downlink radio signals from the repeater station, wherein the repeater station comprises a first transmit circuit and a second transmit circuit individually configured to at least one of manipulate data and control information of the uplink and downlink radio signals and synchronize the uplink and downlink radio signals for transmission using the repeater station.

2. The wireless local loop according to claim 1 wherein the uplink and downlink radio signals individually comprise at least one personal handy-phone system slot.

3. The wireless local loop according to claim 1 wherein the first transmit circuit and the second transmit circuit are coupled with respective ones of a plurality of transmit paths of the repeater station.

4. The wireless local loop according to claim 1 wherein the wherein the repeater station comprises:
   an antenna configured to transmit radio signals to the base station and the portable station; and
   a switch configured to selectively couple the first transmit circuit and the second transmit circuit with the antenna.

5. The wireless local loop according to claim 4 wherein the first transmit circuit and the second transmit circuit are individually configured to synchronize the uplink and the downlink radio signals.

6. The wireless local loop according to claim 1 wherein the first transmit circuit and the second transmit circuit are individually configured to manipulate the data and the control information.

7. The wireless local loop according to claim 1 wherein the repeater station is configured to establish a first transmit timing reference and a second transmit timing reference responsive to communication delays intermediate the repeater station and respective ones of the base station and the portable station.

8. The wireless local loop according to claim 1 wherein the repeater device is configured to transmit at least one of the uplink and downlink radio signals at a moment in time while simultaneously receiving at least one other of the uplink and downlink radio signals at the same moment in time.

9. The wireless local loop according to claim 1 wherein the repeater station is configured to communicate radio signals with the base station at a moment in time while simultaneously communicating radio signals with the portable station at the same moment in time.

10. The wireless local loop according to claim 1 wherein the wherein the repeater station is configured to transmit one of the radio signals comprising a slot at a moment in time while simultaneously receiving another of the radio signals comprising a slot at the same moment in time.

11. The wireless local loop according to claim 1 wherein the wherein the repeater station comprises a plurality of antennas individually configured to at least one of transmit and receive the uplink and downlink radio signals.

12. The wireless local loop according to claim 11 wherein one of the antennas is configured to transmit the uplink and downlink radio signals and the other of the antennas is configured to receive the uplink and downlink radio signals.

13. A wireless local loop, comprising:
    a base station configured to communicate via a plurality of first radio frequency signals within a first cell;
    a repeater station positioned within the first cell and configured to communicate with the base station via the first radio frequency signals, the repeater station configured to communicate via a plurality of second radio frequency signals within a second cell; and
    a portable station positioned within the second cell and configured to communicate with the repeater station via the second radio frequency signals, wherein the repeater station is configured to simultaneously communicate with the base station and the portable station at the same moment in time.

14. The wireless local loop according to claim 13 wherein a baseband signal of the first and second radio frequency signals comprises a plurality of slots.

15. The wireless local loop according to claim 13 wherein the repeater station comprises plural transmit circuits individually configured to synchronize the first and second radio frequency signals.

16. The wireless local loop according to claim 13 wherein the repeater station comprises plural transmit circuits individually configured to manipulate at least one of data and control information for transmission using the repeater station.

17. The wireless local loop according to claim 16 wherein the repeater station comprises:
    an antenna configured to transmit radio signals to the base station and the portable station; and
    a switch configured to selectively couple the first transmit circuit and the second transmit circuit with the antenna.

18. The wireless local loop according to claim 13 wherein the repeater station is configured to transmit at least one radio frequency signal while simultaneously receiving at least one other radio frequency signal at the same moment in time.

19. The wireless local loop according to claim 13 wherein the repeater station is configured to transmit a radio frequency signal comprising a slot and at a moment in time while simultaneously receiving another radio frequency signal comprising another slot at the same moment in time.

20. A method of communicating information comprising:
    first receiving a reference event comprising a predefined pattern within a repeater station comprising a first transmit circuit and a second transmit circuit;
    following the first receiving, establishing a receive timing reference, a first transmit timing reference and a second transmit timing reference;
    second receiving a plurality of uplink slots and a plurality of downlink slots;
    synchronizing the uplink slots and the down links slots using respective ones of the first transmit circuit and the second transmit circuit; and
    transmitting the uplink slots and the downlink slots according to respective ones of the first transmit timing reference and the second transmit timing reference and using respective ones of the first transmit circuit and the second transmit circuit.

21. The method according to claim 20 further comprising manipulating at least one of data and the control information of the uplink slots and downlink slots using respective one of the first transmit circuit and the second transmit circuit.

22. The method according to claim 20 wherein the second receiving and the transmitting occur at the same moment in time.

23. The method according to claim 20 wherein the transmitting comprises transmitting at least one of the uplink slots and the downlink slots while simultaneously receiving at least one of the uplink slots and the downlink slots at the same moment in time.

24. The method according to claim 20 wherein the receivings individually comprise receiving using a first antenna and the transmitting comprises transmitting using a second antenna.

25. The method according to claim 24 wherein the transmitting comprises selectively coupling the first transmit circuit and the second transmit with the second antenna.

26. The method according to claim 20 further comprising receiving the uplink slots using a base station.

27. The method according to claim 20 wherein the establishing defines timing references within a repeater station.

28. The method according to claim 20 wherein the transmitting of the uplink slots is according to the first transmit timing reference.

29. The method according to claim 20 wherein the transmitting of the downlink slots is according to the second transmit timing reference.

30. A method of communicating information comprising:
using a base station, transmitting a plurality of downlink slots and receiving a plurality of uplink slots;
using a portable station, transmitting the uplink slots and receiving the downlink slots; and
transmitting at least one of the uplink slots and the downlink slots using a repeater station while simultaneously receiving at least one of the uplink slots and the downlink slots using the repeater station at the same moment in time.

31. The method according to claim 30 further comprising:
establishing a receive timing reference, a first transmit timing reference and a second transmit timing reference within a repeater station, the receive timing reference lags a transmit timing reference of the base station and the first transmit timing reference of the repeater station leads a receive timing reference of the base station corresponding to communication delays intermediate the base station and the repeater station and the second transmit timing reference of the repeater station leads a receive timing reference of the portable station corresponding to communication delays intermediate the repeater station and the portable station; and
receiving the uplink slots and downlink slots according to the receive timing reference using the repeater station.

32. The method according to claim 30 further comprising transmitting the uplink slots according to the first transmit timing reference using the repeater station.

33. The method according to claim 30 wherein the transmitting using the repeater station comprises transmitting using a first antenna of the repeater station and the receiving using the repeater station comprises receiving using a second antenna of the repeater station.

34. The method according to claim 30 wherein the transmitting using the repeater station comprises transmitting the uplink slots using a first transmit circuit and transmitting the downlink slots using a second transmit circuit.

35. The method according to claim 30 wherein the uplink slots and downlink slots comprise personal handy-phone system slots.

36. A method of communicating information comprising:
establishing a receive timing reference, a first transmit timing reference and a second transmit timing reference using a repeater station;
receiving a downlink slot at the repeater station in accordance with the receive timing reference;
receiving an uplink slot at the repeater station in accordance with the receive timing reference;
transmitting the uplink slot using the repeater station in accordance with the first transmit timing reference; and
transmitting the downlink slot using the repeater station in accordance with the second transmit timing reference, wherein the transmitting of at least one of the uplink slot and the downlink slot using the repeater station comprises transmitting during the same moment in time as receiving one of the uplink slot and the downlink slot using the repeater station.

37. The method according to claim 36 wherein the transmitting comprise transmitting using respective ones of a first transmit circuit and a second transmit circuit of the repeater station, the first transmit circuit and the second transmit circuit being individually configured to synchronize respective ones of the uplink slot and the downlink slot.

38. The method according to claim 36 wherein the slots comprise personal handy-phone system slots.

39. The method according to claim 36 wherein the transmitting comprise transmitting the uplink slot using a first transmit circuit and the transmitting the downlink slot using a second transmit circuit.

40. The method according to claim 36 wherein the transmitting individually comprise transmitting using a first antenna of the repeater station and the receiving comprises receiving using a second antenna of the repeater station.

41. The method according to claim 36 further comprising receiving the downlink slots using a portable station.

42. The method according to claim 36 further comprising receiving the uplink slots using a base station.

43. The method according to claim 36 wherein the establishing defines timing references within the repeater station.

44. A method of transmitting information within a personal handy-phone system wireless local loop comprising:
using a personal handy-phone system base station, first transmitting a personal handy-phone system slot comprising a unique word;
first receiving the unique word at a personal handy-phone system repeater station;
following the first receiving, establishing a receive timing reference, a first transmit timing reference and a second transmit timing reference;
using the personal handy-phone system base station, second transmitting a downlink personal handy-phone system slot;
second receiving the downlink personal handy-phone system slot at the repeater station in accordance with the receive timing reference;
using a personal handy-phone system portable station, third transmitting an uplink personal handy-phone system slot;
third receiving the uplink personal handy-phone system slot at the repeater station in accordance with the receive timing reference;
using a first transmit circuit of the personal handy-phone system repeater station, fourth transmitting the uplink personal handy-phone system slot in accordance with the first transmit timing reference;

using a second transmit circuit of the personal handy-phone system repeater station, fifth transmitting the downlink personal handy-phone system slot in accordance with the second transmit timing reference;

selectively coupling the first transmit circuit and the second transmit circuit with an antenna of the personal handy-phone system repeater station to implement the fourth and fifth transmitting;

fourth receiving the uplink personal handy-phone system slot at the personal handy-phone system base station; and fifth receiving the downlink personal handy-phone system slot at the personal handy-phone system portable station, wherein at least one of the fourth transmitting and the fifth transmitting comprises transmitting at the same moment in time as at least one of the second receiving and the third receiving.

45. The method according to claim 44 wherein the second and third receivings individually comprise receiving using another antenna of the personal handy-phone system repeater station.

* * * * *